April 28, 1964  D. K. MEYER ETAL  3,130,655
PHOTOGRAPHIC APPARATUS
Filed Jan. 21, 1963  7 Sheets-Sheet 1
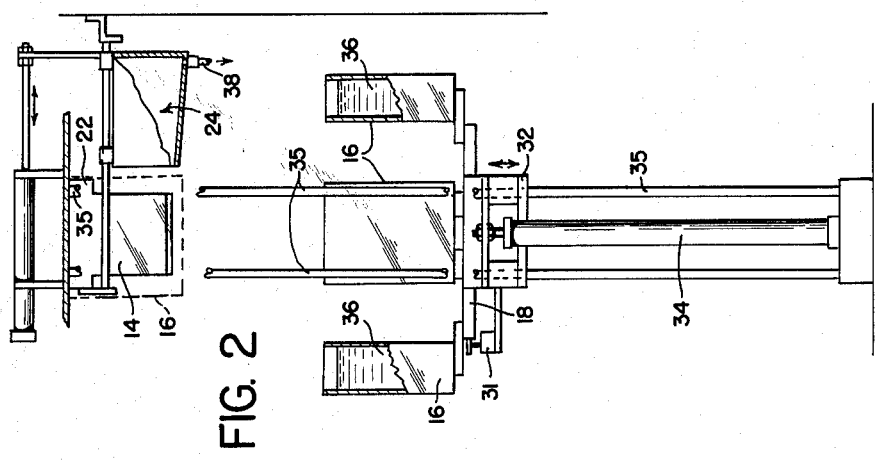
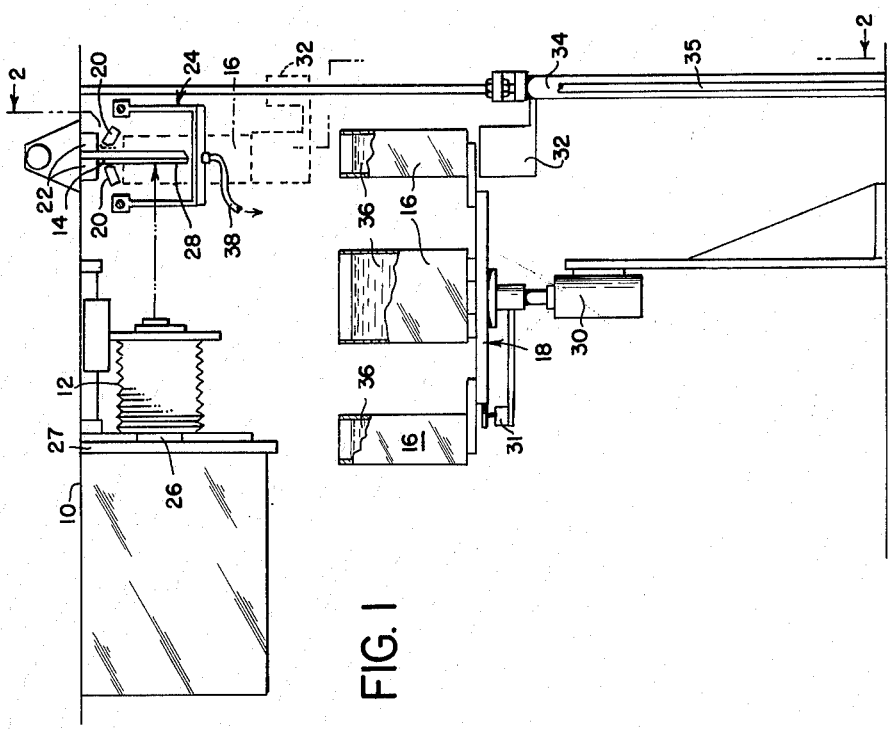
INVENTORS
DONALD K. MEYER
ARTHUR G. OSTREM
GEORGE J. POLLMAN
BY
ATTORNEYS

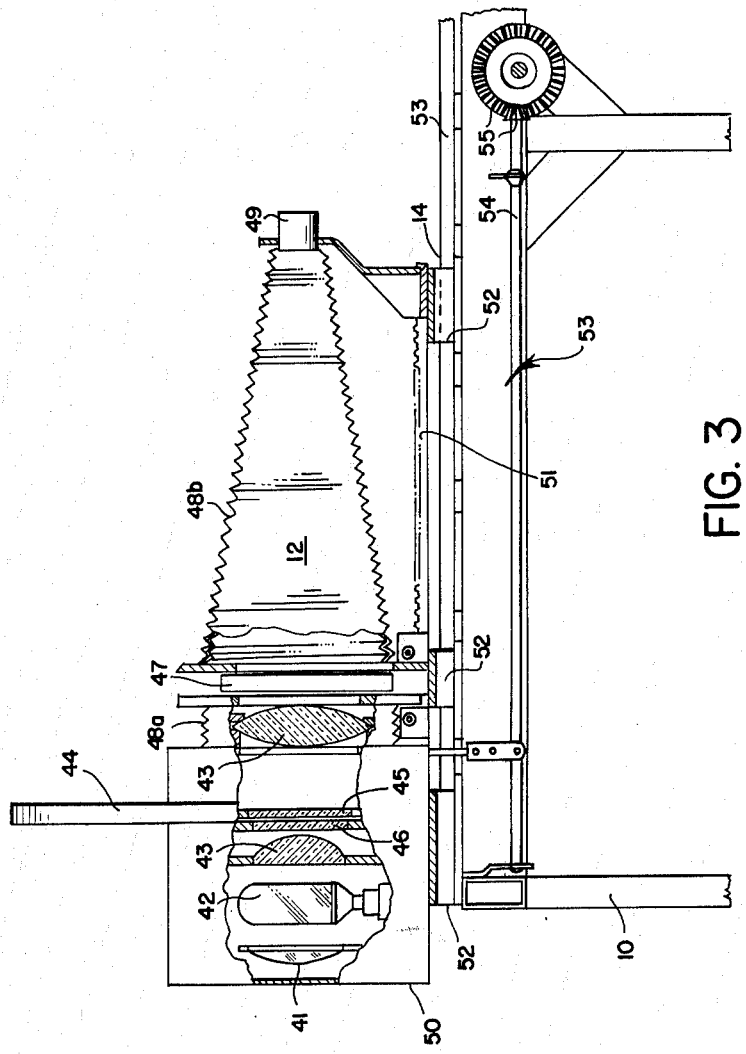

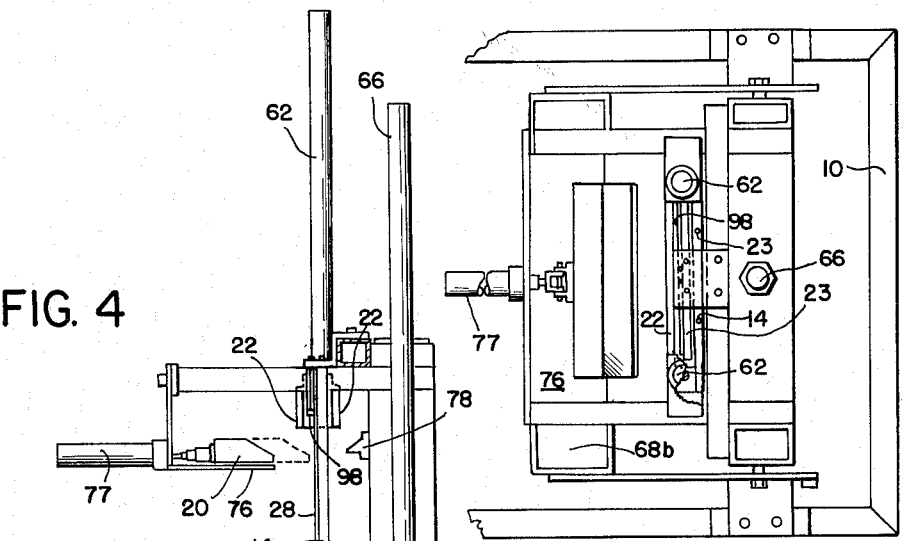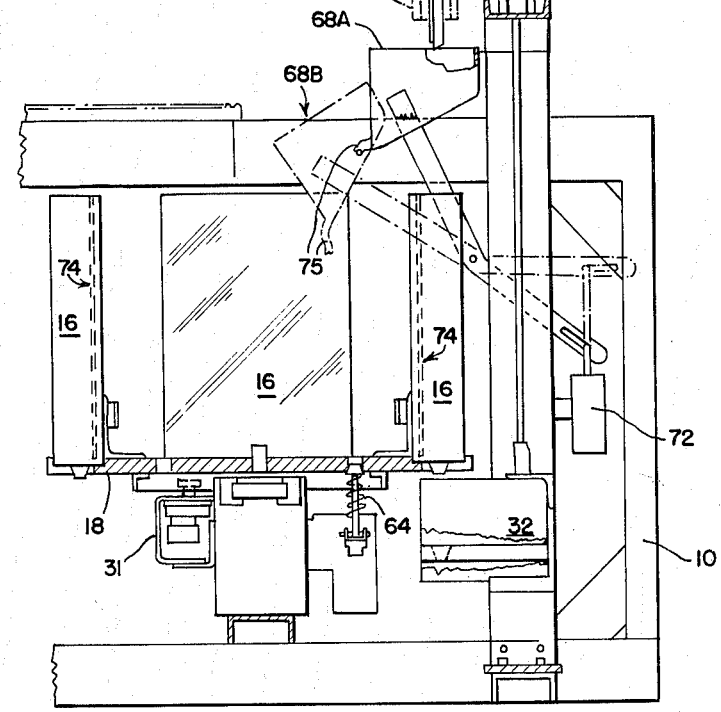

April 28, 1964 D. K. MEYER ETAL 3,130,655
PHOTOGRAPHIC APPARATUS
Filed Jan. 21, 1963 7 Sheets-Sheet 4

INVENTORS
DONALD K. MEYER
ARTHUR G. OSTEM
GEORGE J. POLLMAN
BY
ATTORNEYS

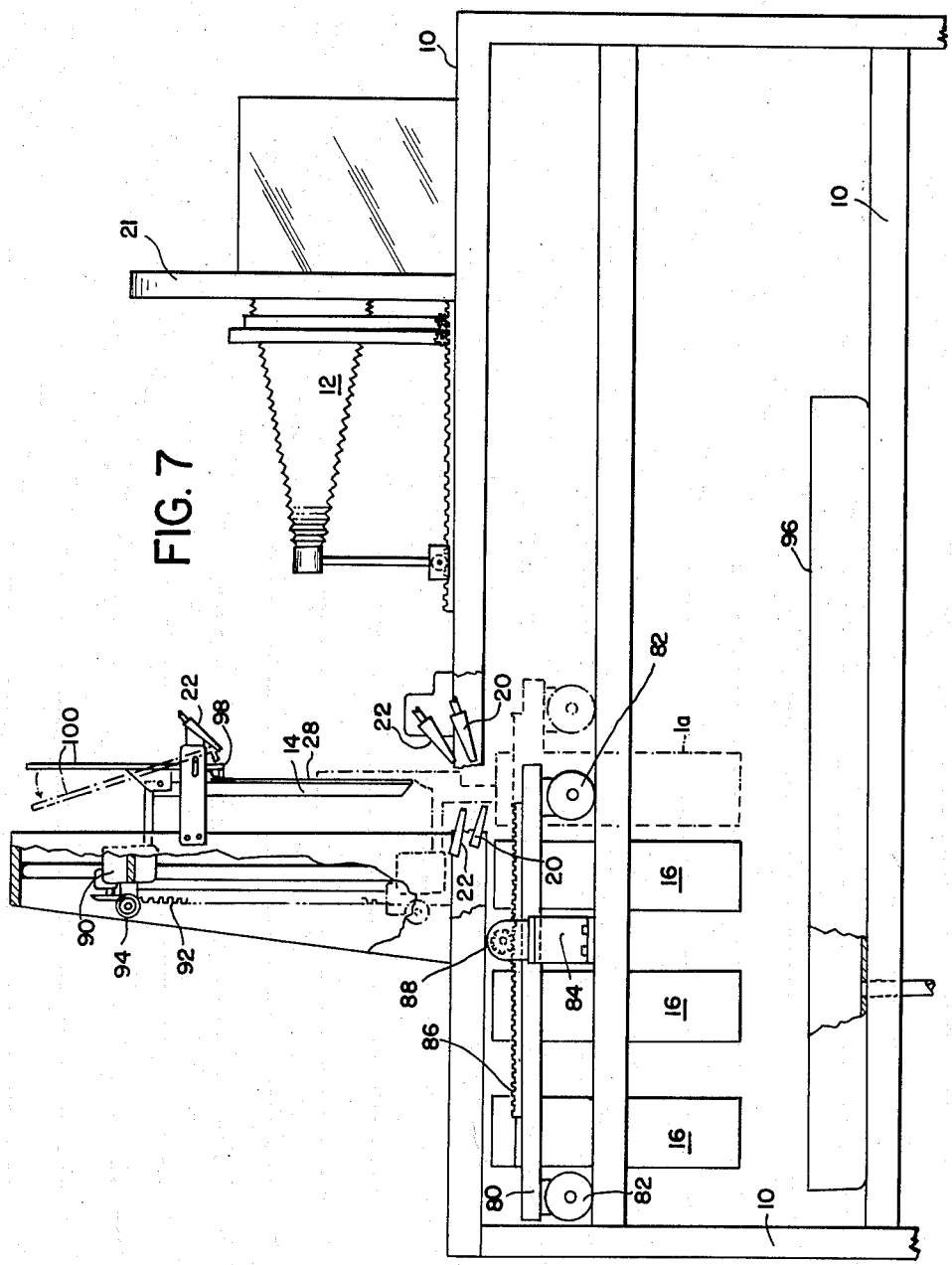

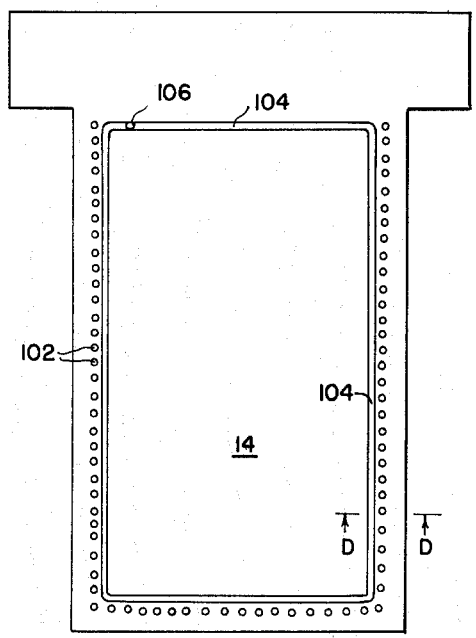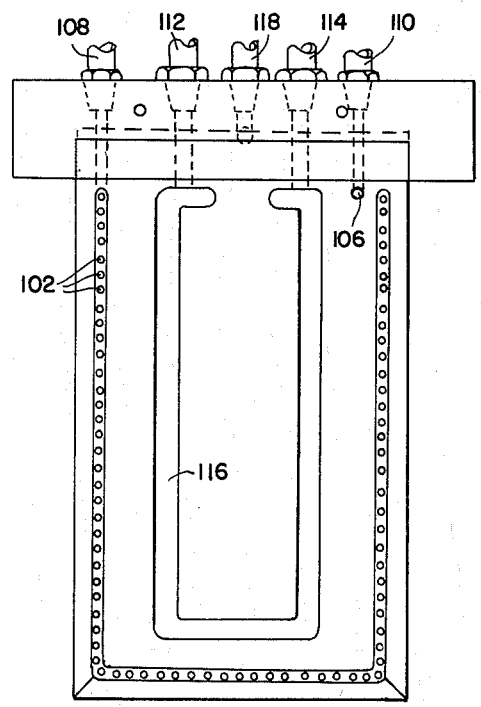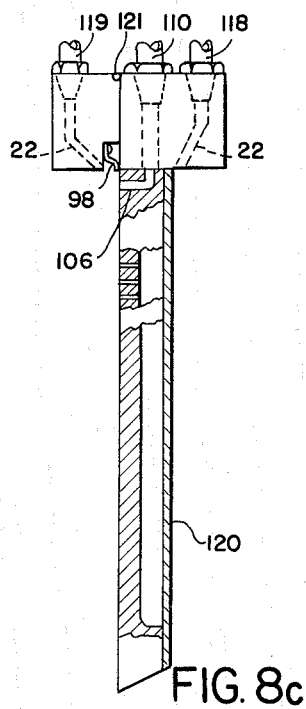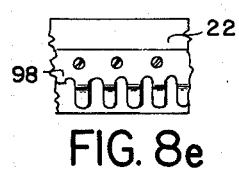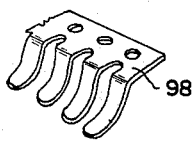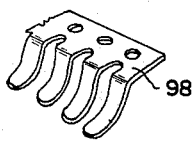

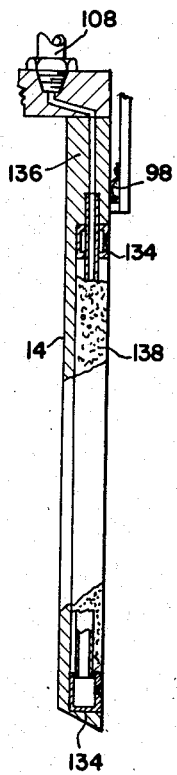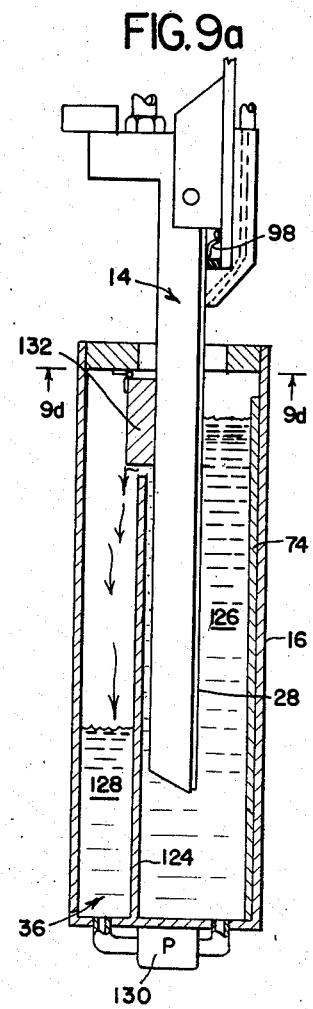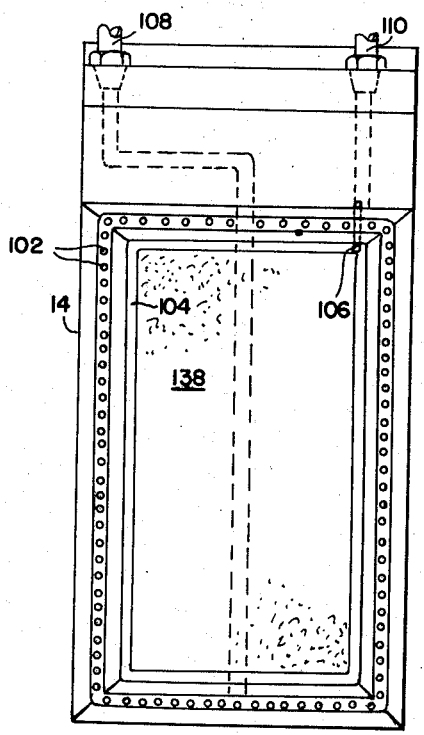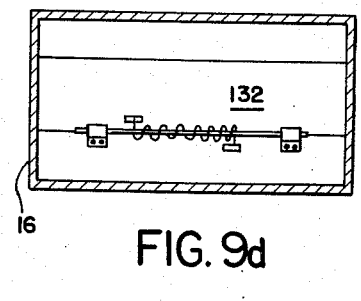
April 28, 1964 D. K. MEYER ETAL 3,130,655
PHOTOGRAPHIC APPARATUS
Filed Jan. 21, 1963 7 Sheets-Sheet 7
FIG. 9b
FIG. 9a
FIG. 9c
FIG. 9d
INVENTORS
DONALD K. MEYER
ARTHUR G. OSTREM
GEORGE J. POLLMAN
BY
Carpenter, Abbott, Coulter & Kinney
ATTORNEYS

United States Patent Office 3,130,655
Patented Apr. 28, 1964

3,130,655
PHOTOGRAPHIC APPARATUS
Donald K. Meyer, West St. Paul, Arthur G. Ostrem, St. Paul, and George J. Pollman, Lake Elmo, Minn., assignors to Minnesota Mining and Manufacturing Company, St. Paul, Minn., a corporation of Delaware
Filed Jan. 21, 1963, Ser. No. 252,643
8 Claims. (Cl. 95—1.7)

This invention relates to unique apparatus capable of producing prints on a photosensitive sheet having a photoconductor coating on an electrically conductive backing. The apparatus is an automatic, programmed combination enlarger and processor capable of rapidly producing prints in a uniform reproducible manner of professional custom quality. It is particularly effective as a combination enlarger and processor for producing dry multicolored prints in less than 5 minutes although black and white prints may also be prepared. It also offers an effective apparatus for producing color separation prints, i.e. prints of individual colors in color or black and white in less than 2 minutes. The prints conventionally produced are continuous tone prints although the apparatus may be modified so as to produce half tone prints.

Since the primary colors (cyan, yellow, magenta) are individually exposed and processed, the machine may be used to produce a variety of prints from the same negative that cannot be produced by ordinary color processes where the three colors are produced simultaneously in a multi-layer construction.

The method for the electrolytic preparation of a visible reproduction of a light image on photoconductor sheets is described in Johnson and Neher U.S. Patent No. 3,010,883 patented November 28, 1961. Photoconductor copy-sheets utilized in the preparation of the visible reproductions are described in Johnson and Neher, U.S. Patent No. 3,010,884 patented November 28, 1961. The preparation of preferred colored visible reproductions of light images on photoconductor sheets is described in copending applications Serial Nos. 22,931 and 23,017, filed April 18, 1960.

An object of this invention is to disclose an apparatus for utilizing the technology of the above applications in an automatic apparatus for producing visible reproductions from color negatives in a programmed manner by electrical controls. The apparatus comprises in combination a projector for separately and successively projecting onto a photoconductor sheet material held on a supporting member, tanks for the dye solutions which contain the material to be electrolytically deposited on the photoconductor sheet and into which the photoconductor sheet is immersed, suitable means for rinsing and drying the supporting member and exposed portions of the photoconductor sheet, and a control assembly for operatively interconnecting the other members by electrically programming the sequential production of prints and controlling color balance, density and contrast.

In the drawings, FIGURE 1 is a schematic representation of one embodiment of the automatic combination projector and processor apparatus for producing prints on photoconductor sheets employing a stationary support for the photoconductor sheet.

FIGURE 2 is a cross-sectional drawing along the line E of FIGURE 1.

FIGURES 3 and 4 are schematic representations of a second embodiment of the automatic combination projector and processor apparatus in which the support is again stationary.

FIGURES 5 and 6 are top views of the embodiment of FIGURES 3 and 4.

FIGURE 7 is a schematic representation of the automatic combination projector and processor apparatus employing a movable support for the photoconductor sheet.

Figure 6:
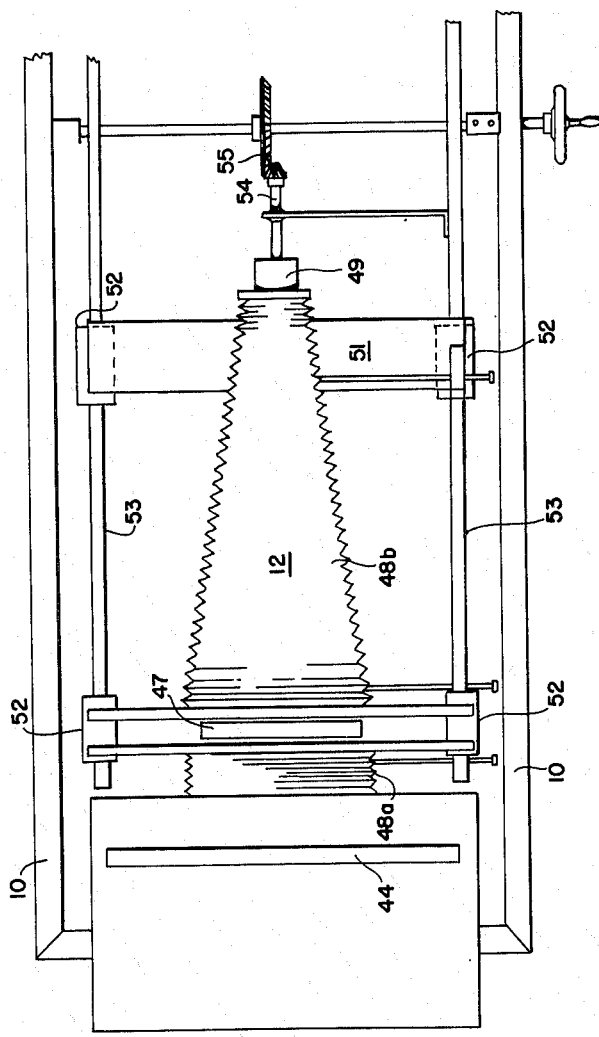

FIGURES 8a, b, c, d, e, and f represent one embodiment of a support for the photoconductor sheet.

FIGURES 9a, b, c and d represent a second embodiment of the support and associated parts.

The apparatus of FIGURES 1 and 2 consists of a frame 10 upon which is mounted a projector 12, a support platen 14, dye tanks 16 mounted on a rotatable turntable 18, water knives 20, air knife 22, the front air knife 22 also serves as a clamp and cathode contact, and wash shield 24. In the preparation of a print the various members are controlled electrically. The projector 12 is turned on and with the color negative 26 in place in front of the filter wheel 27, the shutter of the projector is opened and an image projected for the desired exposure on the photoconductor sheet 28 held in place on the support platen 14, by vacuum and air knife 22. With the desired tank 16 on rim driven turntable 18 supported by double ball bearing pillow block 30 rotated directly under the support platen 14 by the motor 31, the elevator 32 is raised by means of hydraulic cylinder 34 and guided by rods 35 until the photoconductor sheet 28 is immersed in the dye solution 36. Development of the image takes place by passing a current through the dye solution 36 from an anode in the tank to the conductive backing of the photoconductor sheet 28. The tank 16 is lowered and the wash shield 24 is moved laterally into position surrounding the support platen 14 so as to catch the water from the water knives 20 which are employed to wash the excess dye solution from the support platen 14 and the photoconductor sheet 28. The water in the wash shield 24 is passed to the drain through the hose 38. The water from the water knife also serves the function of dark adapting the photoconductor coating. This latter purpose is facilitated by the use of warm water in the rinsing step. After sufficient water has been applied, a curtain of air is applied from knife 22 over the wetted surfaces of support platen 14 and the photoconductor sheet 28 so as to provide non-abrading uniform drying and to restore photosensitivity to the photoconductive coating. At this point, a second image may be projected on the photoconductor sheet 28 from the projector 12 and the procedure repeated. This is facilitated time-wise by rotating the filter wheel 27 and turntable 18 to the next color simultaneously with the washing and drying steps.

FIGURE 3 shows projector 12 mounted on the frame 10 and consists of the reflector 41 in back of the projection lamp 42, condensing lenses 43 on both sides of the filter wheel 27, which contains the filters 45 which are protected by heat absorbing glass 46, negative holder 47 in between bellows 48a and 48b and the projection lens 49. The projection lens 49 is mounted on focusing rack 51. The projector assembly 12 is mounted by supports 52 on rails 53 and controlled by lead screw 54 and gears 55 for adjusting the distance of the projector 12 from the support platen 14 of FIGURE 4.

FIGURE 4 represents the apparatus of this invention in which the dye tanks 16 are rotated and raised to immerse the stationary support platen 14. In this embodiment the air knife 22 is movable and water knife 20 is retractable. The movable air knives 22 are connected to an air supply through air lines 23 and are positioned around the front and back sides of support platen 14. The air knives 22 are raised and lowered on cylinder 62 so as to provide a uniform non-abrading drying of the photoconductor sheet 28.

In operation, the photoconductor sheet 28 is placed on the support platen 14 and electrical contact with the photoconductor sheet 28 is made by a fingerstock 98. An image is projected onto the photoconductor sheet from projector 12. The appropriate dye tank 16 is positioned below the support platen 14 by rotating the turntable 18 with motor 31. The turntable 18 is positioned accurately by lock mechanism 64. Cylinder 66 raises tank elevator 32 to immerse the support platen 14 at which time the wash bucket assembly 68 is retaracted out of the path of elevator 32 to position B and dye tank 16 by solenoid and arm assembly 72. When the anode 74 contained in the dye tank 16 is in the image area, an electrical current is passed through the dye solution and photoconductor sheet 28 so as to deposit an image on the conductive areas of the photoconductor sheet 28.

The dye tank 16 is lowered and replaced on the turntable 18. The wash bucket assembly 68 is placed under the support platen 14 in position A to catch the wash water coming off of the support platen 14 and the water delivered to the drain by hose 75. Water knife 20 is moved forward on plate 76 by cylinder 77 to a position adjacent the support platen 14. The support platen 14 is then washed with a non-abrading uniform flow of water from water knife 20 and water sprays 78 positioned behind the support platen 14. At the end of the wash period the water knife 20 is retracted and air knives 22 are lowered so as to dry all wetted surfaces of the support platen 14, and then retracted. In the preparation of multicolored prints, the combination enlarger and processor apparatus is ready for another image to be projected in registry from the projector 12.

The apparatus of FIGURE 7 consists of a frame 10 upon which is mounted on projector 12 a movable support platen 14, dye tanks 16 mounted on a carriage 80 movable horizontally over rollers 82 so as to place the tanks 16 in position 1a directly under the support planten 14 with the motor 84 driven rack 86 and gear 88 assembly. The support platen 14 is lowered into tank 16 with the motor 90 driven rack 92 and gear 94.

Deposition of the image takes place while the support platen 14 is immersed in the dye tank 16. The support platen 14 is raised and the tank is moved horizontally. The support platen 14 is then lowered in a wash position adjacent to the dye tanks 16. Water knives 20 are used to apply a nonabrading uniform flow of water to the support platen 14 and photoconductor sheet 28. The wash water is caught in pan 96. The support platen 14 is raised during which time the air knives 22 are used to apply a non-abrading stream of air to the photoconductor sheet 28 so as to remove water from the photoconductor sheet 28 and restore uniform photosensitivity to the photoconductive coating. The photoconductor sheet 28 is clamped in place by fingerstock 98 fastened to arm 100. Air knife 22 at the top of the support platen 14 is employed to apply air of the desired humidity to the photoconductor sheet 28.

FIGURE 8a shows the front face of the support platen 14 which has been provided with a plurality of interconnected apertures 102, a channel 104 and aperture 106 which are employed to retain and support the photoconductor sheet in register on the face of the platen 14. A partial vacuum in channel 104 is utilized to improve uniformity of the print.

FIGURE 8b represents a rear view of the support platen 14 without back cover plate wherein the apertures 102 are connected to outlet 108 and aperture 106 to outlet 110 for connection to the vacuum producing device. Water aspirator vacuum is sufficient for the purpose of holding the photoconductor sheet 28 in place and to remove any dye solution or water that leaks behind the photoconductor sheet, thereby preventing contamination in the following step. Outlets 112 and 114 provide for the circulation of water through channel 116 if it is desirable to control the temperature of the support platen 14. Ouetlet 118 provides air for rear air knife 22.

FIGURE 8c is a cross-sectional view of the platen showing the aperture 106 connected to outlet 110 with back plate 120 in place. The front air knife 22 also functions as a clamp and cathode contact at fingerstock 98 by pivoting at hinge 121.

FIGURE 8d is a sectional view along the lines DD of FIGURE 8a wherein the channel 104 is shown to be adjacent the vacuum apertures 102. Apertures 102 are connected internally to vacuum manifold 122 and then to outlet 108.

FIGURE 8e is a plane view of fingerstock 98 used for establishing electrical contact with the photoconductor sheet attached to pivotable block an air knife 22.

FIGURE 8f is a partial isometric view of the preferred fingerstock 98.

FIGURE 9a shows the support platen 14 immersed in tank 16. The tank 16 has an inner wall 124 which retains the dye solution 36 at a constant level in chamber 126. The dye solution 36 displaced by the support platen 14 flows into chamber 128. When the support platen 14 is removed, the excess dye in chamber 128 is pumped back into chamber 126 by pump 130 so as to fill it. In this manner, the dye solution in chamber 126 is maintained at a constant level at all times so as to keep that area of the anode 74 adjacent to the image area on the support platen 14 wetted by the dye solution at all times. This same purpose may be accomplished by raising the anode in a single chamber tank simultaneously with the immersion of the support platen.

The tank 16 of FIGURE 9a is equipped with a self-closing lid 132 which is opened by the immersion of the support platen 14 into the dye tank 16.

The support platen 14 of FIGURE 9b shows a solid perimeter vacuum manifold 134 embedded in plastic or metal 136 which is electrically insulated from the cathode finger-stock 98. A heat insulating insert 138 is placed in front of the back solid portion of support platen 14. The insert 138 is suitably made from foamed plastics, such as polystyrene.

FIGURE 9c is a front view of support platen 14 which is provided with heat insulating insert 138 adjacent to channel 104. In this embodiment the apertures 102 are arranged so as to hold all four sides of the photoconductor sheet when a vacuum is applied to outlet 108 which is connected to the apertures 102 at the base of the support platen 14 so as to facilitate removal of any liquids that get behind the photoconductor sheet. Aperture 106 is employed to apply a vacuum to channel 104 through outlet 110.

FIGURE 9d is a sectional view taken on FIGURE 9a showing the bottom of the selfclosing lid in the closed position.

The various components of the combination enlarger and processor are controlled effectively by relays, timers, power supplies, meters and other conventional electrical components housed in a standard relay rack connected to the electrically activated devices by cables.

It will be appreciated that the various components may take different forms compatible with the objective of making a suitable enlarger and processor. For instance, the sheet anode could be replaced by a strip anode or a weir system. The dye solution could also be brought into contact with the photoconductor sheet by extrusion through an orifice containing the anode. Plating current in each case may be supplied from an alternating or direct current source. Constant current or current from a condenser discharge will partially correct exposure error.

The dark adaption of the photoconductor sheet may be facilitated by independent heat sources such as infra-red radiation or heated air and/or platen. Drying of the photoconductor sheet may also be accomplished by a movable vacuum knife passing over the face of the print.

Other modifications that may be incorporated to increase the efficiency and utility of the enlarger-processor would be (1) an automatic method for loading and unloading the photoconductor sheet, such as a continuous roll, (2) replenishing system from storage tanks to maintain the dye solution at the desired composition, (3) retractable easel frame for maintaining white marginal broders on the photoconductor sheet, (4) interchangeable projector lamp indexing device to facilitate the use of a mercury and tungsten light source to optimize the blue, red and green light requirements, (5) multiple platen construction to permit simultaneous projection and processing, and (6) a perimeter holding device for supporting the photoconductor sheet alone in register so as to eliminate the necessity of a bulky support platen thereby permitting less dye displacement and to minimize heat transfer from the photoconductor sheet.

By plating the various dyes in different orders and densities, the system is capable of producing automatically masked images in both color and black and white prints. This makes possible the construction of a color negative in which the deficiencies in the light absorption of the dyes in both the picture taking and print making material can be automatically masked in the final print.

It may be desirable to apply a protective coating, such as a film laminate or film forming liquid to the surface of the print. This coating protects against surface abrasion and changes the normally mat surface to a glossy surface.

We claim:

1. An automatic, programmed combination enlarger and processor apparatus for rapidly producing prints on a photosensitive sheet having a photoconductive coating on an electrically conductive backing comprising in combination: projection means for separately and successively projecting onto said sheet in accurate registry a series of monochromatic light-images; tank means for supplying a series of dye baths, each of said tank means including electrode means for establishing anodic contact with the corresponding dye bath; support means for holding said sheet in focus and registry with said projection means during exposure to each of said light-images and for establishing cathodic contact to the conductive backing; dipping means for successively immersing said sheet held in said support means in each of said dye baths for electrolytic deposition of a corresponding dye at light-struck areas of said sheet and for then removing said sheet from contact with said dye bath; rinsing means for applying a non-abrading uniform flow of water to said sheet and said support means and dark adapting the photoconductive coating after its removal from said dye bath; non-abrading uniform drying means for removing water from said sheet and restoring uniform photosensitivity to the photoconductive coating; drying means for removing water from said support and control means operatively interconnecting said projection means, tank means, support means, dipping means, rinsing means and drying means for electrically programming the sequential production of prints.

2. An automatic, programmed combination enlarger and processor apparatus for rapidly producing prints on a photosensitive sheet having a photoconductive coating on an electrically conductive backing comprising in combination: projection means for separately and successively projecting onto said sheet in accurate registry a series of monochromatic light-images; movable tank means for supplying a series of dye baths, each of said tank means including electrode means for establishing anodic contact with the corresponding dye bath; said tanks mounted on a rotatable base for positioning each of said tanks directly under a support means for holding said sheet in focus and registry with said projection means during exposure to each of said light-images and for establishing cathodic contact to the conductive backing; dipping means for successively immersing said sheet held in said support means in each of said dye baths for electrolytic deposition of a corresponding dye at light-struck areas of said sheet and for then removing said sheet from contact with said dye bath; rinsing means for applying a non-abrading uniform flow of water to said sheet and said support means and dark adapting the photoconductive coating after its removal from said dye bath; non-abrading uniform drying means for removing water from said sheet and restoring uniform photosensitivity to the photoconductive coating; drying means for removing water from said support and control means operatively interconnecting said projection means, tank means, support means, dipping means, rinsing means and drying means for electrically programming the sequential production of prints.

3. An automatic, programmed combination enlarger and processor apparatus for rapidly producing prints on a photosensitive sheet having a photoconductive coating on an electrically conductive backing comprising in combination: projection means for separately and successively projecting onto said sheet in accurate regisetry a series of monochromatic light-images; movable tank means for supplying a series of dye baths, each of said tank means including electrode means for establishing anodic contact with the corresponding dye bath; said tanks mounted on a horizontal linear track for positioning each of said tanks directly under a support means for holding said sheet in focus and registry with said projection means during exposure to each of said light-images and for establishing cathodic contact to the conductive backing; dipping means for successively immersing said sheet held in said support means in each of said dye baths for electrolytic deposition of a corresponding dye at light-struck areas of said sheet and for then removing said sheet from contact with said dye bath; rinsing means for applying a non-abrading uniform flow of water to said sheet and said support means and dark adapting the photoconductive coating after its removal from said dye bath; non-abrading uniform drying means for removing water from said sheet and restoring uniform photosensitivity to the photoconductive coating; drying means for removing water from said support and control means operatively interconnecting said projection means, tank means, support means, dipping means, rinsing means, and drying means for electrically programming the sequential production of prints.

4. An automatic, programmed combination enlarger and processor apparatus for rapidly producing prints on a photosensitive sheet having a photoconductive coating on an electrically conductive backing comprising in combination: projection means for separately and successively projecting onto said sheet in accurate registry a series of monochromatic light-images; movable tank means for supplying a series of dye baths, each of said tank means including electrode means for establishing anodic contact with the corresponding dye bath; stationary support means for holding said sheet in focus and registry with said projection means during exposure to each of said light-images and for establishing cathodic contact to the conductive backing; movable dipping means for successively immersing said sheet held in said stationary support by positioning, raising and lowering each of said dye baths individually for electrolytic deposition of a corresponding dye at light-struck areas of said sheet and for then removing said sheet from contact with said dye bath; rinsing means for applying a non-abrading uniform flow of water to said sheet and said support means and dark adapting the photoconductive coating after its removal from said dye bath; non-abrading uniform drying means for removing water fro msaid sheet and restoring uniform photosensitivity to the photoconductive coating; drying means for removing water from said support and control means operatively interconnecting said projection means, tank means, support means, dipping means, rinsing means and drying means for electrically programming the sequential production of prints.

5. An automatic, programmed combination enlarger and processor apparatus for rapidly producing prints on a photosensitive sheet having a photoconductive coating on an electrically conductive backing comprising in combination: projection means for separately and successively projecting onto said sheet in accurate registry a series of monochromatic light-images; tank means for supplying a series of dye baths, each of said tank means including electrode means for establishing anodic contact with the corresponding dye bath; support means for holding said sheet in focus and registry with said projection means during exposure to each of said light-images and for establishing cathodic contact to the conductive backing; said support means provided with a vacuum means for positioning and holding said conductive backing in position on said support means; dipping means for successively immersing said sheet held in said support means in each of said dye btths for electrolytic deposition of a corresponding dye at light-struck areas of said sheet and for then removing said sheet from contact with said dye bath; rinsing means for applying a non-abrading uniform flow of water to said sheet and said support means and dark adapting the photoconductive coating after its removal from said dye bath; non-abrading uniform drying means for removing water from said sheet and restoring uniform photosensitivity to the photoconductive coating; drying means for removing water from said support and control means operatively interconnecting said projection means, tank means, support means, dipping means, rinsing means and drying means for electrically programming the sequential production of prints.

6. An automatic, programmed combination enlarger and processor apparatus for rapidly producing prints on a photosensitive sheet having a photoconductive coating on an electrically conductive backing comprising in combination: projection means for separately and successively projecting onto said sheet in accurate registry a series of monochromatic light-images from a color negative; movable tank means for supplying a series of dye baths, each of said tank means including electrode means for establishing anodic contact with the corresponding dye bath; stationary support means positioned for holding said sheet in a plane parallel to the plane of said color negative and in focus and registry with said projection means during exposure to each of said light-images and for establishing cathodic contact to the conductive backing; dipping means for elevating said tanks and immersing said support means and said sheet held in said support means in each of said dye baths for electrolytic deposition of a corresponding dye at light-struck areas of said sheet and for then removing said sheet from contact with said dye bath; a movable water knife positioned near said support means and adjacent to the top of said sheet as a rinsing means for appblying a non-abrading uniform flow of water to said sheet and said support means and dark adapting the photoconductive coating after its removal from said dye bath; an air knife positioned adjacent said support means and movable across the front surface as a non-abrading uniform drying means for removing water from said sheet and restoring uniform photosensitivity to the photoconductive coating; drying means for removing water from said support and control means operatively interconnecting said projection means, tank means, support means, dipping means, rinsing means and drying means for electrically programming the sequential production of prints.

7. An automatic, programmed combination enlarger and processor apparatus for rapidly producing prints on a photosensitive sheet having a photoconductive coating on an electrically conductive backing comprising in combination: projection means for separately and successively projecting onto said sheet in accurate registry a series of monochromatic light-images; movable tank means for supplying a series of dye baths, each of said tank means including electrode means for establishing anodic contact with the corresponding dye bath; movable support means positioned horizontal to said projection means and vertical to said tank means for holding said sheet in focus and registry with said projection means during exposure to each of said light-images and for establishing cathodic contact to the conductive backing; dipping means for lowering said support means into said tank and successively immersing said sheet held in said support means in each of said dye baths for electrolytic deposition of a corresponding dye at light-struck areas of said sheet and for then removing said sheet from contact with said dye bath; a water knife positioned near said support means and adjacent to the top of said sheet as a rinsing means for applying a non-abrading uniform flow of water to said sheet and said support means and dark adapting the photoconductive coating after its removal from said dye bath; stationary air knife as a non-abrading uniform drying means for removing water from said sheet and restoring uniform photosensitivity to the photoconductive coating; drying means for removing water from said support and control means operatively interconnecting said projection means, tank means, support means, dipping means, rinsing means and drying means for electrically programming the sequential production of prints.

8. An automatic, programmed combination enlarger and processor apparatus for rapidly producing prints on a photosensitive sheet having a photoconductive coating on an electrically conductive backing comprising in combination: projection means for separately and successively projecting onto said sheet in accurate registry a series of monochromatic light-images; means for supplying a series of dye baths, each of which includes electrode means for establishing anodic contact with the corresponding dye bath; support means for holding said sheet in focus and registry with said projection means during exposure to each of said light images and for establishing cathodic contact to the conductive backing of said sheet; means for successively contacting said sheet held in said support means with the contents of each of said dye baths for electrolytic deposition of a corresponding dye at light struck areas of said sheet and for then removing said sheet from contact with said dye bath; rinsing means for applying a non-abrading uniform flow of water to said sheet and said support means and dark adapting the photoconductive coating after its removal from said dye bath; non-abrading uniform drying means for removing water from said sheet and restoring uniform photosensitivity to the photoconductive coating; drying means for removing water from said support and control means operatively interconnecting each of the aforesaid means for electrically programming the sequential production of prints.

References Cited in the file of this patent
UNITED STATES PATENTS

| | | |
|---|---|---|
| 3,010,883 | Johnson et al. | Nov. 28, 1961 |
| 3,010,884 | Johnson et al. | Nov. 28, 1961 |
| 3,011,963 | Johnson et al. | Dec. 5, 1961 |
| 3,057,787 | Sagura | Oct. 9, 1962 |
| 3,057,788 | Reithel | Oct. 9, 1962 |
| 3,072,542 | Johnson et al. | Jan. 8, 1963 |
| 3,085,051 | Hamm et al. | Apr. 9, 1963 |
| 3,088,883 | Robillard | May 7, 1963 |
| 3,090,706 | Cado | May 21, 1963 |
| 3,095,808 | Eastman | July 2, 1963 |
| 3,096,260 | Nail | July 2, 1963 |